(No Model.)  6 Sheets—Sheet 2.
C. BANKER & J. H. ROBERTS.
MACHINE FOR MAKING ELEVATOR BUCKETS.
No. 331,109. Patented Nov. 24, 1885.
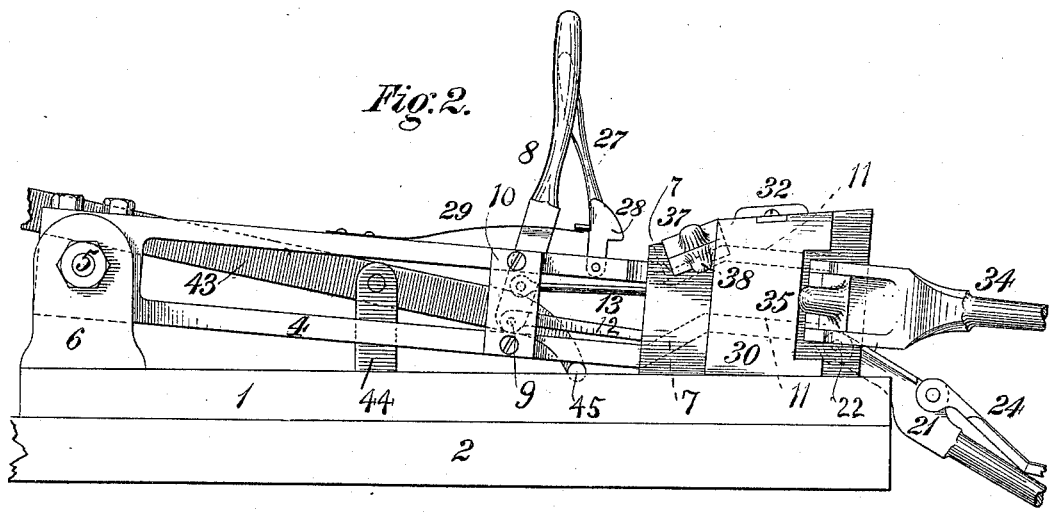
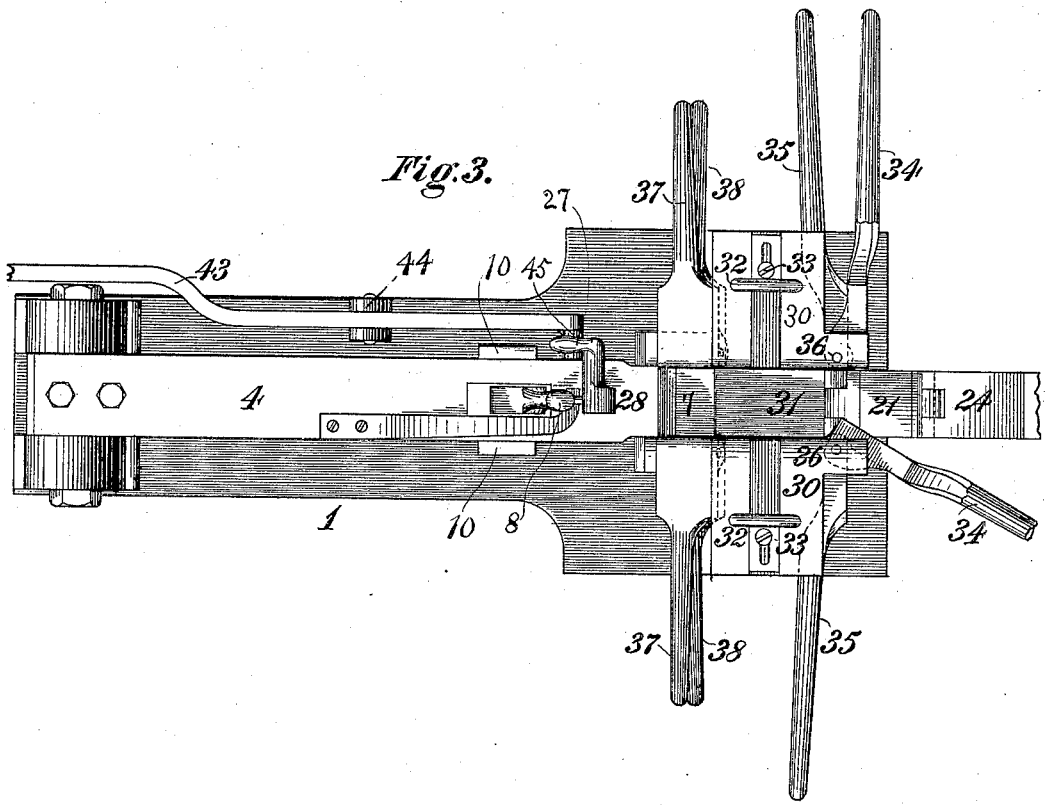

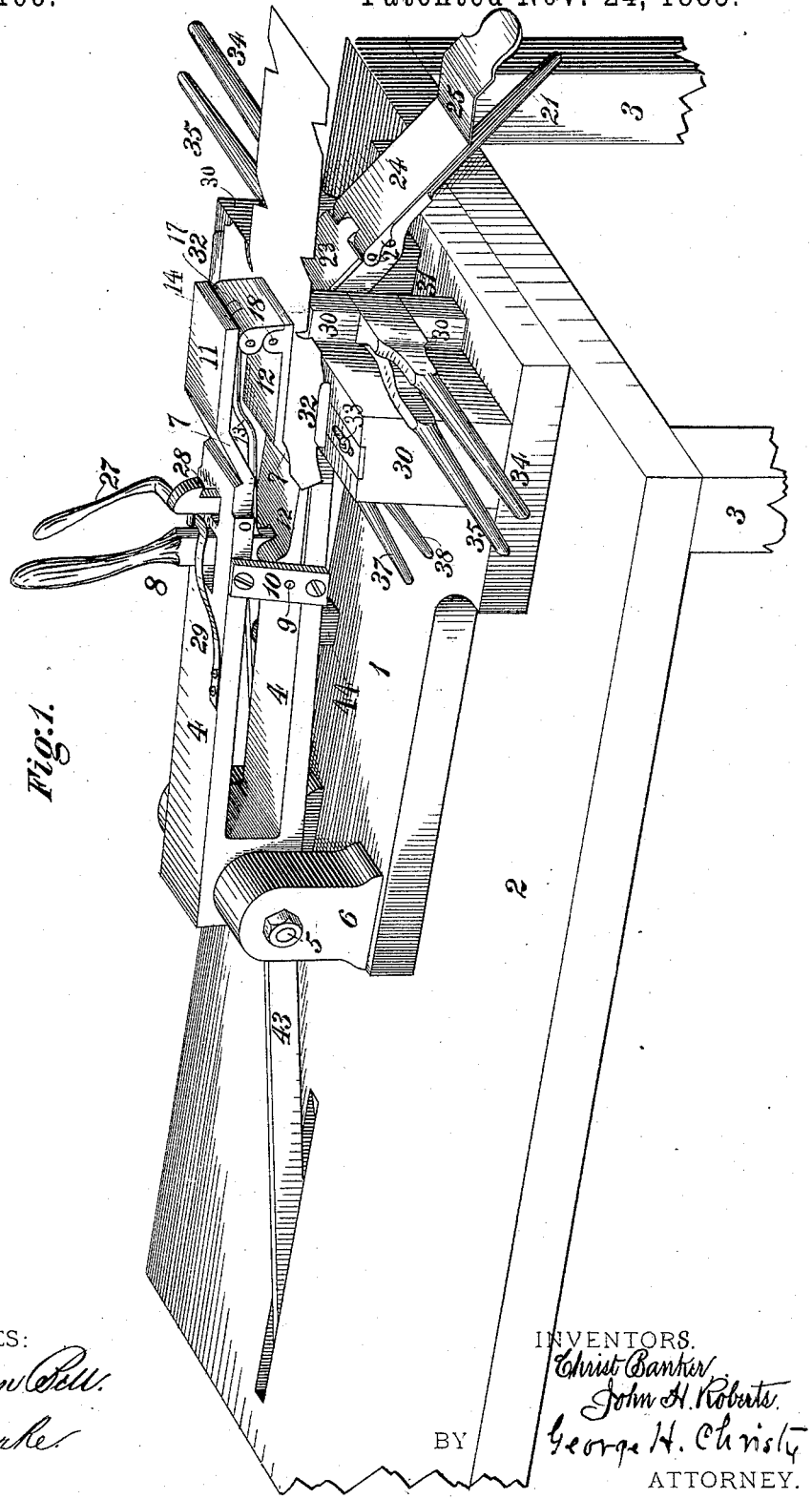

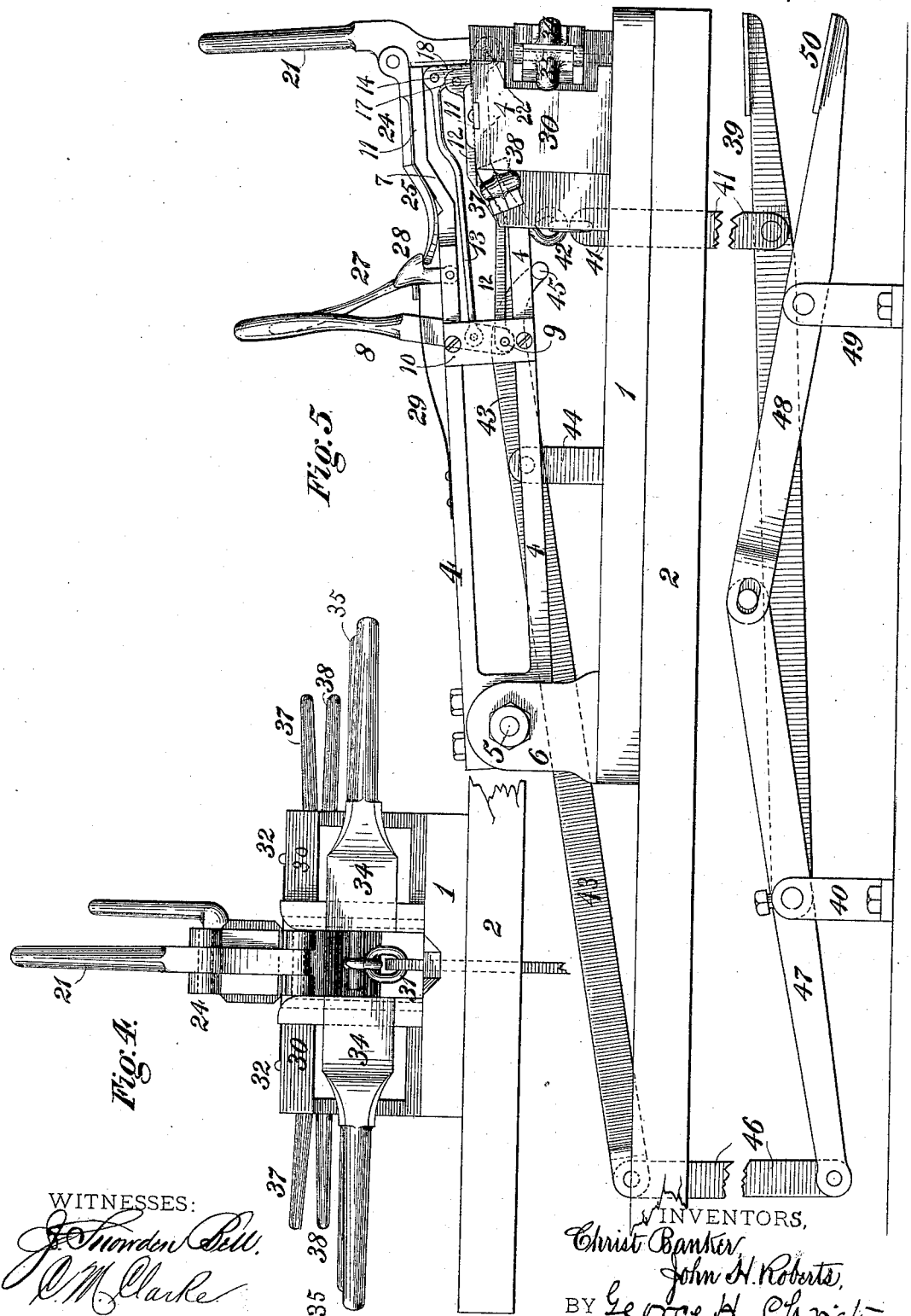

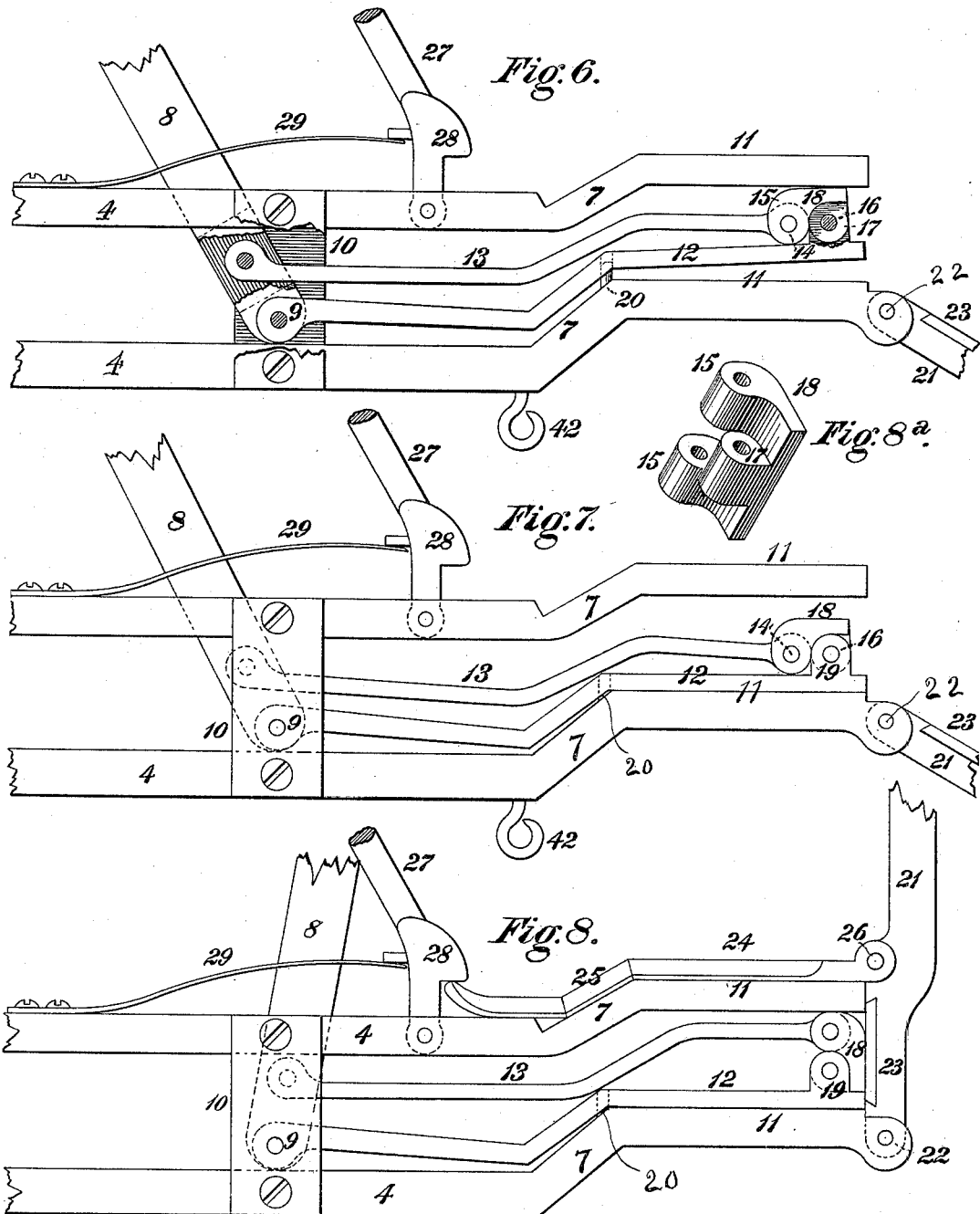

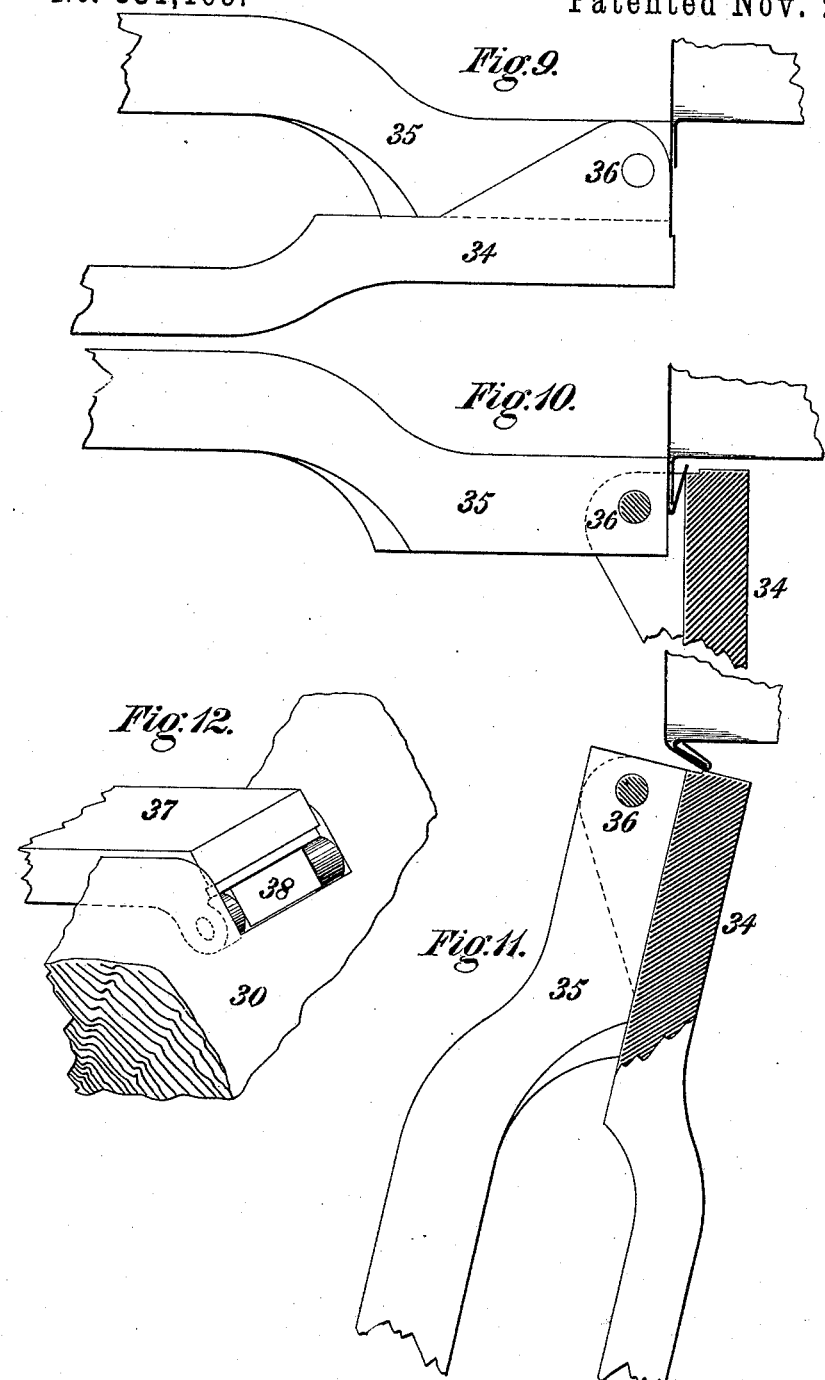

(No Model.)  6 Sheets—Sheet 6.

C. BANKER & J. H. ROBERTS.
MACHINE FOR MAKING ELEVATOR BUCKETS.

No. 331,109. Patented Nov. 24, 1885.

WITNESSES:

INVENTORS.
Christ Banker
John H. Roberts
BY George H. Christy
ATTORNEY.

UNITED STATES PATENT OFFICE.

CHRIST BANKER AND JOHN H. ROBERTS, OF PITTSBURG, PENNSYLVANIA, ASSIGNORS TO WILLIAM M. BABBOTT, OF SAME PLACE.

MACHINE FOR MAKING ELEVATOR-BUCKETS.

SPECIFICATION forming part of Letters Patent No. 331,109, dated November 24, 1885.

Application filed November 5, 1884. Serial No. 147,205. (No model.)

*To all whom it may concern:*

Be it known that we, CHRIST BANKER and JOHN H. ROBERTS, citizens of the United States, residing at Pittsburg, in the county of Allegheny and State of Pennsylvania, have invented or discovered certain new and useful Improvements in Machines for Making Elevator-Buckets, of which improvements the following is a specification.

Figure 13:
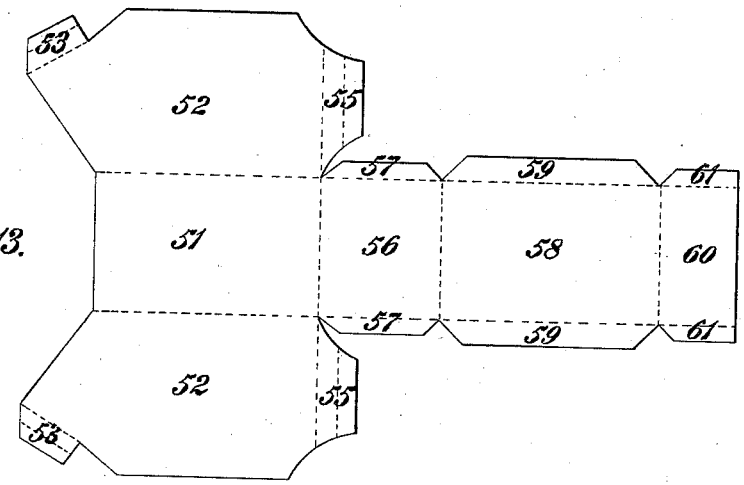
Figure 14:
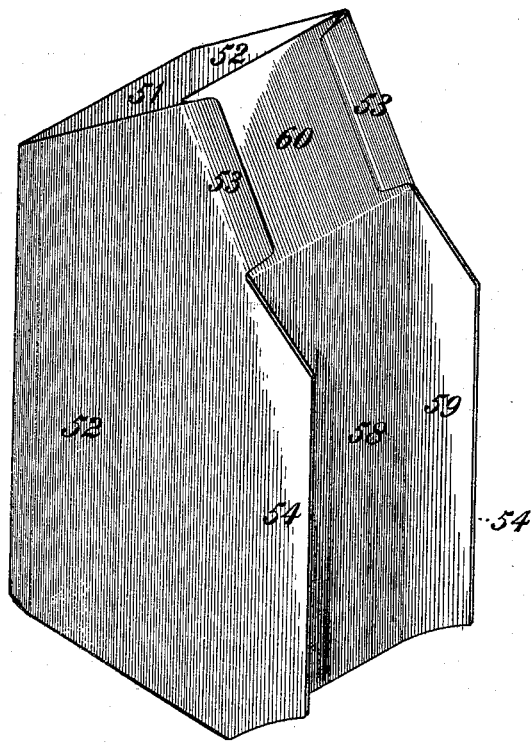

In the accompanying drawings, which make part of this specification, Figure 1, Sheet 1, is a view in perspective of a machine for making elevator-buckets embodying our invention; Fig. 2, Sheet 2, a side view in elevation of the same, except the treadles and their connections, the mandrel being shown as drawn into position for the formation of the seams; Fig. 3, a plan or top view with the parts in the positions shown in Fig. 2; Fig. 4, Sheet 3, a front view; Fig. 5, a side view in elevation with the top of the mandrel elevated above the forming-die; Figs. 6 to 8, inclusive, Sheet 4, side views in elevation, and on an enlarged scale, of portions of the mandrel, illustrating, respectively, different positions of the clamping and bending levers connected thereto; Fig. 8ᵃ, a view in perspective of the bearing-plate which is connected to the clamping-plate; Figs. 9 to 11, inclusive, Sheet 5, views in elevation of a portion of a pair of seaming-levers, illustrating the formation of a double seam; Fig. 12, a view in perspective of the pivoted ends of a pair of said levers; Fig. 13, Sheet 6, a view in elevation of a sheet-metal blank adapted to be formed into an elevator-bucket by the operation of the machine, and Fig. 14 a view in perspective of a finished bucket.

The object of our invention is to facilitate and economize the manufacture of sheet-metal elevator-buckets of substantially similar construction to that set forth in an application for Letters Patent of the United States filed by William M. Babbott and ourselves under date of October 1, 1884, Serial No. 144,421, by the provision of effective and desirable mechanism for suitably bending and seaming a sheet-metal blank into an elevator-bucket of the desired form.

To this end our improvements consist in certain novel devices and combinations hereinafter set forth.

In the practice of our invention we provide a substantial metallic bed-plate, 1, which is secured upon a table or bench, 2, supported upon legs or standards 3 at a level convenient to the operator. A pivoted frame or mandrel, 4, consisting of two parallel bars of stout metal, which are secured together at their ends nearest the rear of the machine, and present an intermediate open space for the remainder of their length, is journaled by a pin or bolt, 5, to a pair of standards, 6, on the rear side of the bed-plate 1. Each of the bars forming the mandrel is bent so as to have an inclined portion, 7, the angle of which corresponds with that desired for the back incline of the bucket at a distance from its outer end corresponding with the distance between the back incline and the bottom of the bucket, and a plane bearing-surface, 11, is formed upon the top of each of the bars of the mandrel 4 from its incline 7 to its front end. A clamping-lever, 8, is pivoted by a pin, 9, to a pair of vertical plates, 10, connected to the sides of the upper and lower bars of the mandrel 4, between the inclines 7 thereof and the pivot-pin 5, and a clamping-plate, 12, having on its under side a plane bearing-surface corresponding with the bearing-surface 11 of the lower mandrel plate and an incline corresponding with the incline 7 of said plate, is journaled on the pin 9 of the clamping-lever 8. A rod or bar, 13, is coupled at one end to the clamping-lever 8 above its pivot-pin 9, and at the other by a pin, 14, to lugs 15 upon a bearing-plate, 18, which is in turn coupled by a pin, 16, passing through a lug, 17, on the opposite side of the bearing-plate to standard 19 adjacent to the front end of the clamping-plate 12, the relation of the lever 8, rod 13, plate 18, and clamping-plate 12 being such that when the clamping-lever 8 is thrown to the right the clamping-plate 12 is pressed firmly up to the bearing-surface 11 of the lower bar of the mandrel 4, as shown in Fig. 8, so as to tightly clamp an interposed bucket-blank between its lower face and the bearing-surface 11 of the lower bar of the mandrel, the plate 18 then standing perpendicular to the clamping-plate and in line with the front end thereof when the clamping-plate is brought to a bearing upon a blank resting upon the surface 11 of the lower bar of the mandrel. Guide-pins 20, which fit freely in holes in the clamping-plate 12, are fixed in the lower bar of the mandrel 4, adjacent to the rear side of the bearing-surface 11 thereof, said pins serving to regulate the position of the blank, as hereinafter to be explained. A bottom-bending lever, 21, having a plane bearing-surface corresponding substantially in area with the front end of the mandrel 4, and with the area desired for the bottom of the bucket to be formed, is pivoted by a pin, 22, to the front of the lower bar of the mandrel, a plate, 23, of hard metal being by preference inserted in the bearing-surface. A back-bending plate, 24, having an inclined portion, 25, is pivoted by a pin, 26, to the bottom-bending lever 21 at such distance from the pivot 22 of the latter as to enable it when swung over to fit against that portion of a blank which rests on the bearing-surface 11 and incline 7 of the upper bar of the mandrel. The bottom-bending lever and back-bending plate are clamped in position against the mandrel by a latch-lever, 27, pivoted to the upper bar of the mandrel, and having a latch or stop, 28, which engages the free end of the back-bending plate, and is held thereto by a spring, 29. A forming block or die, 30, having a vertical central recess or open space, 31, is fixed upon the front of the bed-plate 1, its recess 31 being in line with the mandrel 4, and being equal in width as nearly as may be to the width of the mandrel plus twice the thickness of the sheet-metal blanks to be operated on. A gage or stop, 32, is connected adjustably, as by a set-screw, 33, passing through a slotted hole, to the top of the forming-die, on each side of the recess 31 thereof, said gages serving to regulate laterally the position of the blank when placed upon the forming-die. A bottom-seam lap-turning lever, 34, and bottom-seam-closing-down lever, 35, are pivoted by a common pin, 36, to the front of the forming-die 30 on each side of the recess 31, each of said levers having a plane face on its pivoted end adapted by the movement of the lever to be brought to a bearing upon a portion of the metal of a blank fitting over the mandrel 4 and projecting beyond the front end of the same. The bearing-face of the lever 34 is located at a greater distance from the pivot 36 than that of the lever 35, (see Figs. 9 to 11,) so that the lever 34 acts only upon the outer portion of the projecting metal of the blank, while the lever 35 bears upon the inner portion thereof.

The operation of the levers in forming a double-lap seam will be hereinafter explained.

A back incline seam-lap-turning lever, 37, and a back incline seam-closing-down lever, 38, having similar bearing-faces to the levers last above described, are pivoted by common pins to the top of the forming-die 30 on each side of the recess 31 in such location therein that when the mandrel is drawn into its lowest position in the recess of the die the bearing-faces of the levers 37 38 shall be adjacent to the incline 7 of the upper bar of the mandrel and shall stand at the same horizontal angle as said incline, as indicated in Fig. 2. The mandrel 4 is drawn downwardly into the recess of the die by means of a treadle, 39, pivoted to a standard, 40, upon the floor or base of the table of the machine, and coupled by a bar or link, 41, to an eye, 42, on the lower bar of the mandrel 4, and is raised out of the recess by a lever 43, pivoted to a standard, 44, on the bed-plate, and having a laterally-projecting pin, 45, on its forward end, bearing against the lower side of the bottom bar of the mandrel. The rear end of the lever 43 is coupled by a bar or link, 46, to one end of a double-armed lever, 47, pivoted to the standard 40, and the opposite end of the lever 47 is in turn coupled to one end of a double-armed treadle-lever, 48, pivoted to a standard, 49, and having a treadle, 50, on its opposite end.

The machine is designed to operate upon sheet-metal blanks which are cut or stamped into the form shown in Fig. 13, being similar to those set forth in the application of Babbott, Roberts, and Banker, Serial No. 144,421 before referred to, which, while they do not form part of our present invention, are described herein for the purpose of more clearly explaining the operation of the machine.

The bucket-blanks are made up of a front section, 51, located between two side sections, 52, each of which has a back incline lap-section, 53, at and adjacent to the upper end of the outer of two inclined edges at its top. The side sections are made of sufficient width to provide stock for outer flanges, 54, on their outer sides, as seen in the finished bucket, Fig. 14, and a bottom lap-section, 55, adjoins the lower side of each of the side sections, 52. A bottom section, 56, having a lap-section, 57, on each of its sides, is located next to and in line with the front section, 51, and a back section, 58, having an inner flange-section, 59, on each of its sides, adjoins the bottom section, 56, in line therewith and with the front section, and the blank terminates in a back incline section, 60, in line with the sections 51 56 58, and having a lap-section, 61, on each of its sides.

In the operation of the machine the mandrel 4 is first placed in the position shown in Fig. 5—that is to say, with the bearing-surface 11 of its lower bar in line with the top of the forming-die 30. The blank is then placed upon the top of the forming-die with the outer side of its front section, 51, resting against the guide-pins 20, and its side sections, 52, against the guides 32, and is clamped fast between the bearing-surface 11 of the lower bar of the mandrel and the face of the clamping-plate 12 by the movement of the clamping-lever 8 into the position shown in Fig. 8. The bottom section, 56, is then bent perpendicularly to the front section, 51, by turning the bottom-bending lever 21 into the position shown in Fig. 8, and the back section, 58, and back incline section 60 bent perpendicularly and at an angle, respectively, to the bottom section by turning down the back-bending plate 24 into the position shown in the same figure, the plate 24 being held down upon the blank by the latch 28 of the lever 27. The mandrel 4 is then forced downwardly in the recess 31 of the forming-die 30 by pressure upon the treadle 39, and in its downward movement the upper edges of the recess 31, acting upon the blank carried by the carrier 4, bend the side sections, 52, perpendicularly to the front section, 51, and turn up the inside flanges, 59, perpendicularly to the back section, 58, and the incline lap-sections 61 perpendicularly to the back incline section, 60, also turning the lap-sections 57 perpendicularly to the bottom section, 56. The last-named operation may be facilitated by forming slight recesses in the forming-block on each side of the main recess 31 near its top, so as to prevent the sections 57 being acted on until after the bending of the side sections, 52, has been commenced. The boundaries of the bucket being now bent into desired form, the plate 24 is released from the latch 28, and the plate 24 and lever 21 turned down into the position shown in Fig. 2, so as to expose the bottom, back, and back incline of the bucket. The lap portion of one of the sections 53 is then turned over the adjacent section 61 by the upward movement of one of the levers 37, and the back incline double-lap seam on that side completed and closed down by swinging back said lever 37, and then turning said lever and its companion lever, 38, down upon the lap sections. The back incline double-lap seam on the opposite side is then formed in a similar manner by the opposite levers, 37 38. The double-lap seams at the junction of the sides and bottom are then formed and closed down by the levers 34 35 in a similar manner, after which the mandrel is elevated by pressure upon the treadle 50, the clamping-lever 8 moved to the left to slacken the clamping-plate, and the finished elevator-bucket removed from the mandrel.

By the employment of the mechanism above described a material economy of time and labor is effected, and secure and accurate finish attained in the manufacture of elevator-buckets of the class hereinbefore specified.

Blanks of proper form being provided, the operations of bending and seaming may be expeditiously, conveniently, and accurately performed, and without requiring the attendance or supervision of skilled operators for the purpose.

We claim herein as our invention—

1. The combination, with a die, of a mandrel provided with a clamp and having a bottom-bending lever pivoted thereto, and a back-bending plate pivoted to the bottom-bending lever, substantially as set forth.

2. The combination, with a die, of a mandrel, a bottom-bending lever, a back-bending plate, and a clamping-plate, substantially as set forth.

3. The combination, with a die, of a mandrel, a bottom-bending lever, a back-bending plate, and a pivoted latch-lever, substantially as set forth.

4. The combination, with a die, of a mandrel having a clamping-lever pivoted thereto, a clamping-plate coupled to the pivot of the clamping-lever and constructed to bear against a plane surface on the mandrel, a bearing-plate pivoted to the clamping-plate, and a link or bar connecting said bearing-plate with the clamping-lever, substantially as set forth.

5. The combination, with a die, of an upper and a lower bar, said bars being connected at one end and separated for the remainder of their length, a clamping-plate pivoted to the lower bar and constructed to bear against the inner surface thereof adjacent to its open end, a bearing-plate coupled to said clamping-plate and to a rod or bar connected to a clamping-lever, said bearing-plate being constructed to stand perpendicular to the lower bar and in the plane of its open end, a bottom-bending lever pivoted to the open end of the lower bar and constructed to bear against the bearing-plate, and a back-bending plate pivoted to the bottom-bending lever, and constructed to bear against the upper bar, substantially as set forth.

6. The combination of a bed-plate, a mandrel pivoted thereto, a forming-die fixed to the bed-plate and having a central recess in line with and adapted to admit the mandrel, bottom-seaming levers pivoted in pairs on each side of the recess of the forming-die at the end thereof adjacent to the free end of the mandrel, and back-seaming levers pivoted in pairs to the top of the forming-die on each side of its recess and adjacent to its opposite end, substantially as and for the purpose set forth.

7. The combination of a bed-plate, a mandrel pivoted thereto and provided with a bottom-bending lever and back-bending plate, a forming-die fixed to the bed-plate and having a central recess in line with and adapted to admit the mandrel, bottom-seaming levers and back-seaming levers pivoted in pairs to the forming-die on opposite sides of its recess, a treadle-lever coupled to the mandrel and constructed to draw the same downwardly into the recess, a double-armed lever carrying a pin or arm constructed to bear against the lower side of the mandrel and coupled at its opposite end to a double-armed intermediate lever, and a double-armed treadle-lever coupled to said intermediate lever, substantially as set forth.

8. The combination, with a recessed forming-die, of a seam-turning lever and a seam-closing-down lever pivoted upon a common pin to the die at one edge of its recess, each of said levers having a bearing-face on its pivoted end, the bearing-face of the closing-down lever being located at a greater distance from the pivot than that of the seam-turning lever, substantially as set forth.

In testimony whereof we have hereunto set our hands.

CHRIST BANKER.
JOHN H. ROBERTS.

Witnesses:
J. SNOWDEN BELL,
R. H. WHITTLESEY.